United States Patent
Chen et al.

(10) Patent No.: US 9,859,816 B2
(45) Date of Patent: Jan. 2, 2018

(54) METHOD FOR CONTROLLING MODULATION WAVE AND THREE-PHASE THREE-WIRE THREE-LEVEL CIRCUIT

(71) Applicant: Delta Electronics (Shanghai) Co., Ltd., Shanghai (CN)

(72) Inventors: Feng Chen, Shanghai (CN); Cheng Lu, Shanghai (CN); Wei-Qiang Zhang, Shanghai (CN); Hong-Yang Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/279,446

(22) Filed: Sep. 29, 2016

(65) Prior Publication Data
US 2017/0141699 A1 May 18, 2017

(30) Foreign Application Priority Data

Nov. 17, 2015 (CN) .......................... 2015 1 0791588

(51) Int. Cl.
*H02M 7/537* (2006.01)
*H02M 7/5387* (2007.01)
(Continued)

(52) U.S. Cl.
CPC ......... *H02M 7/537* (2013.01); *H02M 7/5395* (2013.01); *H02M 7/53871* (2013.01);
(Continued)

(58) Field of Classification Search
CPC ............... H02M 7/5395; H02M 7/537; H02M 7/53871; H02M 2007/53876
See application file for complete search history.

(56) References Cited

U.S. PATENT DOCUMENTS 5,706,186 A    1/1998  Blasko
5,757,636 A    5/1998  Fletcher
(Continued)

FOREIGN PATENT DOCUMENTS

CN    1299426 C    2/2007
CN    100392975 C  6/2008
(Continued)

OTHER PUBLICATIONS

Ceballos S et al, "Efficient Modulation Technique for a Four-Leg Fault-Tolerant Neutral-Point-Clamped Inverter", IEEE Transactions on Industrial Electronics, IEEE Service Center, Piscataway, NJ, USA, Mar. 1, 2008(Mar. 1, 2008), vol. 55, No. 3, ISSN 0278-0046, pp. 1067-1074, XP011203274.
(Continued)

*Primary Examiner* — Gary L Laxton
*Assistant Examiner* — Peter Novak
(74) *Attorney, Agent, or Firm* — CKC & Partners Co., Ltd.

(57) ABSTRACT

A method for controlling modulation wave and a three-phase three-wire three-level circuit are provided. The method for controlling modulation wave is applied in the three-phase three-wire three-level circuit. Three bridge arms of the three-phase three-wire three-level circuit correspond to three modulation waves. The three-phase three-wire three-level circuit is controlled by comparing said three modulation waves and a carrier wave. The method for controlling modulation wave includes: obtaining a primary modulation wave from said modulation waves based on currents corresponding to each phase of the three-phase three-wire three-level circuit; and adding a shifting quantity to said three modulation waves such that the primary modulation wave is shifted to a peak value, a valley value, or a middle value
(Continued)

between the peak value and the valley value of the carrier wave.

9 Claims, 6 Drawing Sheets

(51) Int. Cl.
*H02M 7/5395* (2006.01)
*H02M 7/487* (2007.01)
*H02M 1/00* (2006.01)

(52) U.S. Cl.
CPC .... *H02M 7/487* (2013.01); *H02M 2001/0025* (2013.01); *H02M 2001/0054* (2013.01); *Y02B 70/1491* (2013.01)

(56) References Cited

U.S. PATENT DOCUMENTS

| | | |
|---|---|---|
| 6,023,417 A | 2/2000 | Hava et al. |
| 2014/0077733 A1* | 3/2014 | Kashima ............... H02P 27/00 318/400.2 |

FOREIGN PATENT DOCUMENTS

| | | |
|---|---|---|
| CN | 100527589 C | 8/2009 |
| CN | 103580520 A | 2/2014 |
| CN | 103618491 A | 3/2014 |

OTHER PUBLICATIONS

Van Nho N et al, "Optimized Discontinuous PWM Algorithm With Variable Load Power Factor for Multilevel Inverters", Power Electronics Specialists Conference, 2006. PESC '06. 37th IEEE Jeju, Korea Jun. 18-22, 2006, Piscataway, NJ, USA,IEEE, (Jun. 18, 2006), ISBN 978-0-7803-9716-3, pp. 1-7, XP010945300.

Kaku B et al, "Switching loss minimised space vector PWM method for IGBT three-level inverter", IEE Proceedings: Electric Power Applications, Institution of Electrical Engineers, GB, (May 13, 1997), vol. 144, No. 3, doi:10.1049/IP-EPA:19970989, ISSN 1350-2352, pp. 182-190, XP006008606.

Bruckner T et al, "Optimal pulse width modulation for three-level inverters", PESC'03. 2003 IEEE 34th. Annual Power Electronics Specialists Conference. Conference Proceedings. Acapulco, Mexico, Jun. 15-19, 2003; [Annual Power Electronics Specialists Conference], New York, NY :; IEEE, US, (Jun. 15, 2003), vol. 1, doi:10.1109/PESC.2003.1218290, ISBN 978-0-7803-7754-7, pp. 165-170, XP010649012.

Lucian Asiminoaei et al, "Reduction of Switching Losses in Active Power Filters With a New Generalized Discontinuous—PWM Strategy", IEEE Transactions on Industrial Electronics, IEEE Service Center, Piscataway, NJ, USA, (Jan. 1, 2008), vol. 55, No. 1, ISSN 0278-0046, pp. 467-471, XP011198514.

\* cited by examiner

METHOD FOR CONTROLLING MODULATION WAVE AND THREE-PHASE THREE-WIRE THREE-LEVEL CIRCUIT

RELATED APPLICATIONS

This application claims priority to China application No. 201510791588.1, filed Nov. 17, 2015, which is herein incorporated by reference.

BACKGROUND

Field of Invention

The present invention relates to a method for controlling wave and a circuit. More particularly, the present invention relates to a method for controlling modulation wave and a three-phase three-wire three-level circuit.

Description of Related Art

With development of power electronics technology, converters using semiconductor switching devices have been widely used in industry, wherein the application of the on/off-grid three-phase three-wire converter becomes more and more, such as the inverter, the rectifier, and the Static Var Generator (SVG).

In the aforementioned circuits, the semiconductor switching devices, such as the Insulated Gate Bipolar Transistor (IGBT), the Metal-Oxide-Semiconductor Field-Effect Transistor (MOSFET), and the SiC MOSFET, are used therein. When the circuit operates, the semiconductor switching device therein will produce switching loss and conduction loss. The aforementioned switching loss is related to the characteristics, the driving circuit, the DC voltage, the flowing current, and the switching frequency of the semiconductor switching device; and the conduction loss is related to the characteristics and the flowing current of the semiconductor switching device.

At this stage, in order to pursue targets, for example, the high power density and reducing the volume of filters, the higher switching frequency is usually adopted. However, once the switching frequency is raised, the switching loss of the semiconductor switching device will be increased correspondingly. If the switching loss is too large, the operating temperature and the system efficiency of the semiconductor switching device will be affected directly.

It can be seen that, in the existing ways which mention above, inconvenience and defect apparently still exists, and it is necessary to be improved. In order to solve the above problems, related fields made a great effort to seek the solutions, but it did not develop the appropriate solutions for so long.

SUMMARY

The summary proposes to provide a simplified abstract of the present disclosure to let readers having basic understanding for the present disclosure. This summary is not a complete overview of the present disclosure, and it does not propose to indicate important/critical components of the present embodiment or define the scope of the present invention.

One aspect of the present invention relates to a method for controlling modulation wave, and the method is applied in a three-phase three-wire three-level circuit. Three bridge arms of the three-phase three-wire three-level circuit correspond to three modulation waves. The three-phase three-wire three-level circuit is controlled by comparing the three modulation waves and the carrier wave. The method for controlling modulation wave includes: obtaining a primary modulation wave from the modulation waves based on the currents corresponding to each phase of the three-phase three-wire three-level circuit; and adding a shifting quantity to the three modulation waves such that the primary modulation wave is shifted to a peak value, a valley value, or a middle value between the peak value and the valley value of the carrier wave.

Another technical aspect of the present invention relates to a method for controlling modulation wave, and the method is applied in a three-phase three-wire three-level circuit. Three bridge arms of the three-phase three-wire three-level circuit correspond to three modulation waves. The three-phase three-wire three-level circuit is controlled by comparing the three modulation waves and the carrier wave. The method for controlling modulation wave includes: obtaining a primary modulation wave from the modulation waves based on the currents corresponding to each phase of the three-phase three-wire three-level circuit; and adding a shifting quantity to the three modulation waves such that the primary modulation wave is shifted to a high value, a low value, or a middle value between the high value and the low value of the carrier wave.

Still another technical aspect of the present invention relates to a three-phase three-wire three-level circuit, and the three-phase three-wire three-level circuit uses the aforementioned method for controlling modulation wave.

Therefore, according to the summary of the present invention, the embodiments of the present invention, by providing a three-phase three-wire three-level circuit and a method for controlling modulation wave, may efficiently reduce the switching loss of the semiconductor switching device, decrease the thermal stress of the semiconductor switching device, and improve the overall system efficiency.

After refer to the embodiments below, people skilled in the art can easily understand the basic spirit of present invention, another purpose of the invention and technical means and aspects taken by present invention.

BRIEF DESCRIPTION OF THE DRAWINGS

To make the above-mentioned and other objects, features, advantages and embodiments become apparent, the accompanying drawings are described below.

Figure 1:
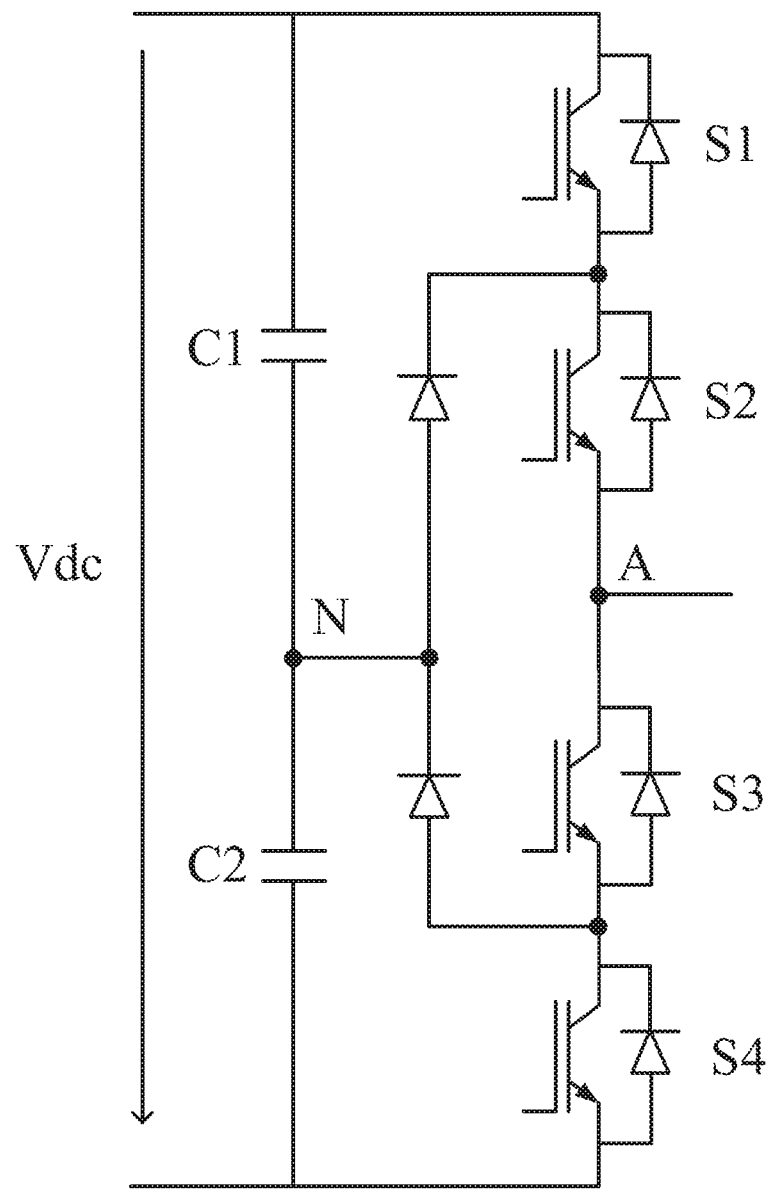
FIG. 1 is a schematic drawing of the bridge arms of the three-level circuit according to embodiments of the present invention.

According to the usual practice, various features and components of the drawings are not drawn to scale. The drawing way is for the best way to present specific features and components which relate to present invention. In addition, the same or similar element symbols are used to indicate similar elements/parts among the different drawings.

DETAILED DESCRIPTION

Specific embodiments of the present invention are described in detail below in order to make the disclosure more complete and detailed. However, they are not the only form to implement or use the embodiments of the invention. The DETAILED DESCRIPTION contains features of many embodiments, steps to construct and operate the embodiments, and the order of the steps. However, other embodiments may be used to achieve such functions and steps.

The terminology used herein has the same meaning with that people skilled in the art may understand unless it is defined additionally in the specification. Furthermore, singular of nouns in the specification may cover plural of the same nouns; and plural of nouns may cover singular of the same nouns when there is no context conflict.

Moreover, "couple" used in the specification means two or more components are physically or electrically connected to each other directly or indirectly, or it may also mean interactions or interoperations of the two or more components.

Figure 2:
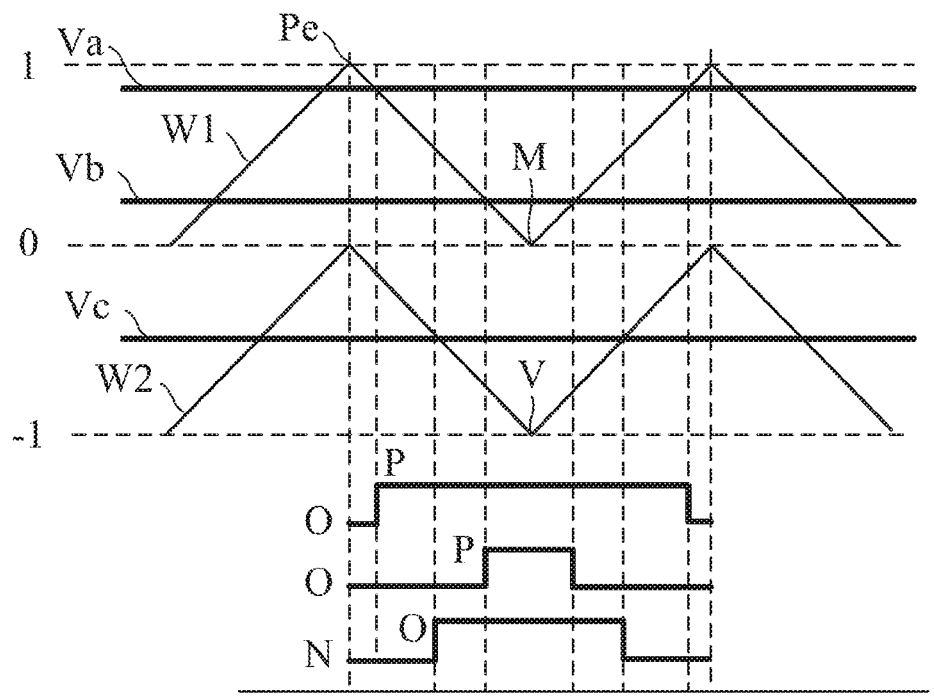
FIG. 2 is a schematic drawing of a method for modulating a sine wave according to embodiments of the present invention.

FIG. 1 is a schematic drawing of the bridge arms of the three-level circuit according to embodiments of the present invention. As shown in the figure, the bridge arms of the three-level circuit use the output level $V_{AN}$ to divide into three operating states, wherein in each operating state, the bridge arms may have different switch combinations, as long as the required level may be outputted in such operating state, for example, the switches S1 and S3 are complementarily turned on, and the switches S2 and S4 are complementarily turned on. The aforementioned operating states are described in detail below:

In conjunction with FIG. 2, in the operating state P, the switch combinations are, for example, the switches S1 and S2 being turned on, and the switches S3 and S4 being turned off; then the output level is:

$$V_{AN}=1/2V_{dc}$$

In the operating state O, the switch combinations are, for example, the switches S2 and S3 being turned on, and the switches S1 and S4 being turned off; then the output level is:

$$V_{AN}=0$$

In the operating state N, the switch combinations are, for example, the switches S3 and S4 being turned on, and the switches S1 and S2 being turned off; then the output level is:

$$V_{AN}=-1/2V_{dc}$$

Based on the aforementioned three operating states, FIG. 2 illustrates the case of the switching action of each phase in a switching cycle in the way of the Sinusoidal Pulse Width Modulation (SPWM). Wherein an upper triangle and a lower triangle are the carrier wave W1 and W2 (i.e., the carrier wave includes W1 and W2), and the labels Va-Vc represent the modulation wave corresponding to the three bridge arms of the three-phase three-wire three-level circuit respectively. Two neighboring vertices of the triangular carrier wave may be a switching cycle, and it is assumed that the modulation wave is basically unchanged in a switching cycle. Furthermore, a logic which compares the modulation wave and carrier wave is that: when the modulation wave is larger than the upper carrier wave W1, the bridge arms are operated in the operating state P; when the modulation wave is less than the lower carrier wave W2, the bridge arms are operated in the operating state N; when the modulation wave is between the upper carrier wave and the lower carrier wave, the bridge arms are operated in the operating state O, but the invention is not limited thereto. Thereby obtaining the action case of the three-phase bridge arms in a switching cycle, but the present invention is not limited thereto. In FIG. 2, in a switching cycle, the actions of the three modulation waves Va-Vc corresponding to the three bridge arms of the three-phase three-wire three-level circuit are both twice.

It should be noted that, in the three-phase three-wire three-level circuit, when three-phase modulation waves Va-Vc are moved the same quantity in the same direction at the same time, each phase of the output voltages and the currents are not affected. That is to say, when the zero sequence component is injected to the modulation waves Va-Vc, each phase of the output voltages and the currents are not affected. In accordance with the aforementioned characteristics, the embodiment of the present invention discloses a method for controlling modulation wave, and the overall switching times of the switches are reduced by moving the same quantity in the same direction at the same time for three-phase modulation waves Va-Vc. Thus, the switching loss may be reduced correspondingly, as described in detail below.

Figure 3:
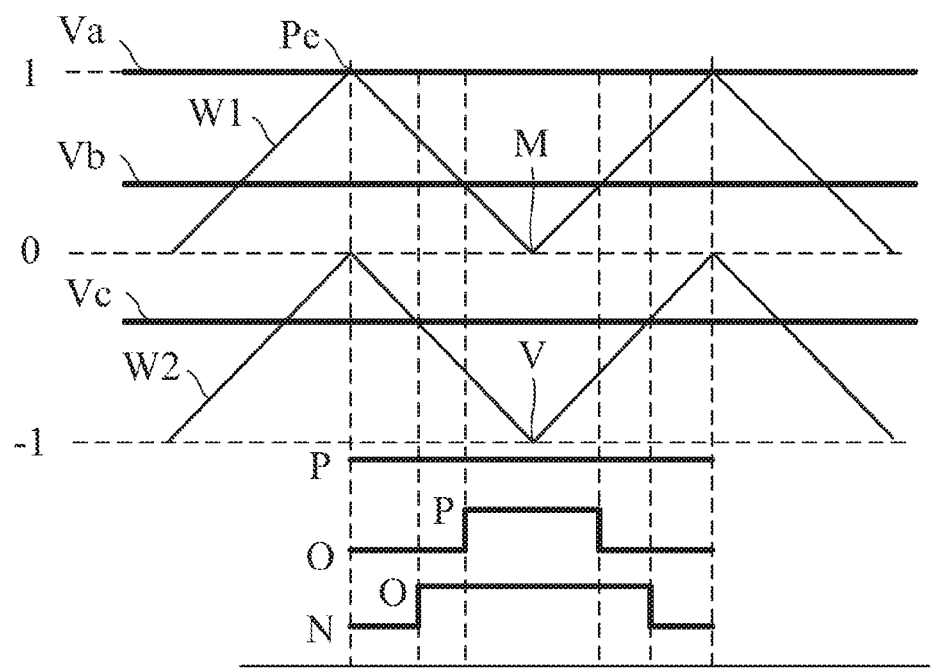
FIG. 3 is a schematic drawing of a method for controlling modulation wave according to embodiments of the present invention.
Figure 4:
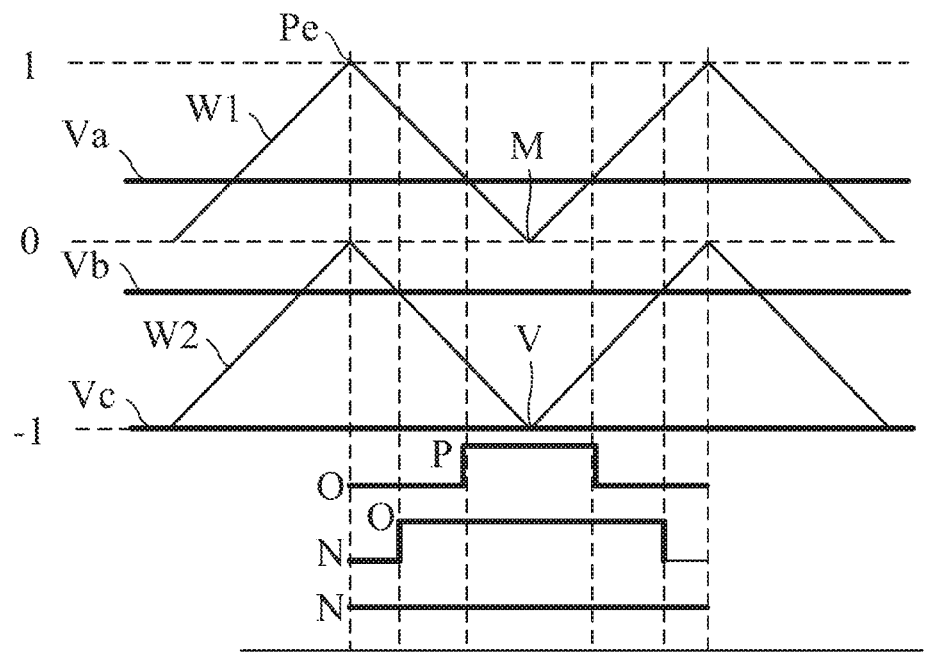
FIG. 4 is a schematic drawing of a method for controlling modulation wave according to embodiments of the present invention.
Figure 5:
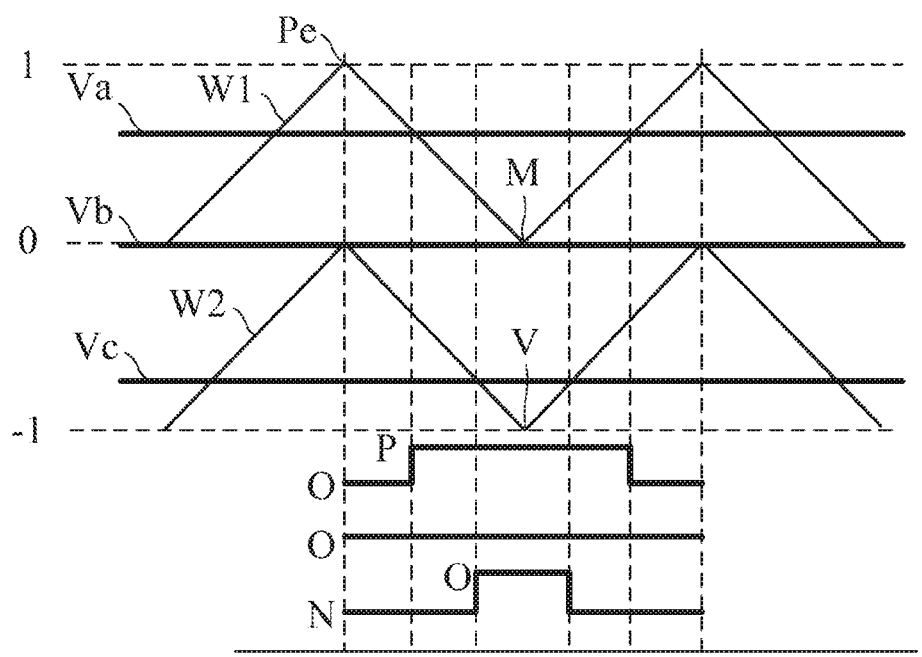
FIG. 5 is a schematic drawing of a method for controlling modulation wave according to embodiments of the present invention.

Please refer to FIGS. 3-5, the method for controlling modulation wave of the embodiment of the present invention controls the three-phase three-wire three-level circuit by comparing the three modulation waves Va-Vc and the carrier wave W1 and W2. The aforementioned method for controlling modulation wave comprises the following steps:

obtaining a primary modulation wave from the three modulation waves Va-Vc based on the currents corresponding to each phase of the three-phase three-wire three-level circuit; and adding a shifting quantity to the three modulation waves Va-Vc such that the primary modulation wave is shifted to a peak value Pe (as shown in FIG. 3), a valley value V (as shown in FIG. 4), or a middle value M (as shown in FIG. 5) between the peak value and the valley value of the carrier wave W1 and W2.

In present invention, the shifting quantity may not only include once adding a single shifting quantity, but also includes once adding the shifting quantity which has been repeatedly adjusted, and further includes multiple adding a plurality of the identical or different shifting quantities, which just need to satisfy that after performing the present method, the three modulation waves have the identical shifting quantity in comparison with the three modulation waves before modulating, but the present invention is not limited thereto.

Thus, in comparison with the switching times of each phase of the circuit being both twice in a switching cycle according to the modulation waves Va-Vc of FIG. 2, at least one phase of the circuit maintains in the same operating state in a switching cycle according to the modulation waves Va-Vc of FIGS. 3-5, such as the A-phase bridge arm in FIG. 3 is maintained in the operating state P, the C-phase bridge arm in FIG. 4 is maintained in the operating state N, and the B-phase bridge arm in FIG. 5 is maintained in the operating state O. Once the bridge arm is maintained in the same operating state in a switching cycle, the bridge arm does not have the switching action. Therefore, the overall switching times of the switches may be reduced by using the method for controlling modulation wave of the embodiment of the present invention. Thus, the switching loss may be efficiently reduced, and the thermal stress of the semiconductor switching device may be decreased, and the overall system efficiency may be improved. However, the present invention is not limited to the aforementioned embodiment, those skilled in the art may add a shifting quantity to the three modulation waves Va-Vc such that the primary modulation wave is shifted to a high value, a low value, or a middle value between the high value and the low value of the carrier wave W1 and W2 according to the actual case of the circuit configuration. In other words, the primary modulation wave is not limited to be shifted to the peak value Pe, the valley value V, or the middle value M between the peak value and the valley value of the carrier wave W1 and W2 as the aforementioned embodiment. The high value is, for example, 0.9 to 1, and the low value is, for example, −1 to −0.9. The switching loss may still be reduced due to circuit switching mechanism.

Please refer to FIGS. 3-5, in an embodiment, the steps for obtaining the primary modulation wave from the three modulation waves Va-Vc which is mentioned above comprises:

determining the current which has the maximum current value of the currents corresponding to each phase of the three-phase three-wire three-level circuit; and taking the modulation wave corresponding to the current which has the maximum current value as the primary modulation wave.

The technical means which solve the problems by using the method for controlling modulation wave of the embodiments of the present invention are described above, the following embodiments which realize the method for controlling modulation wave are provided to enable the present invention easier to understand, however, the present invention is not limited to the following embodiments.

Figure 6:
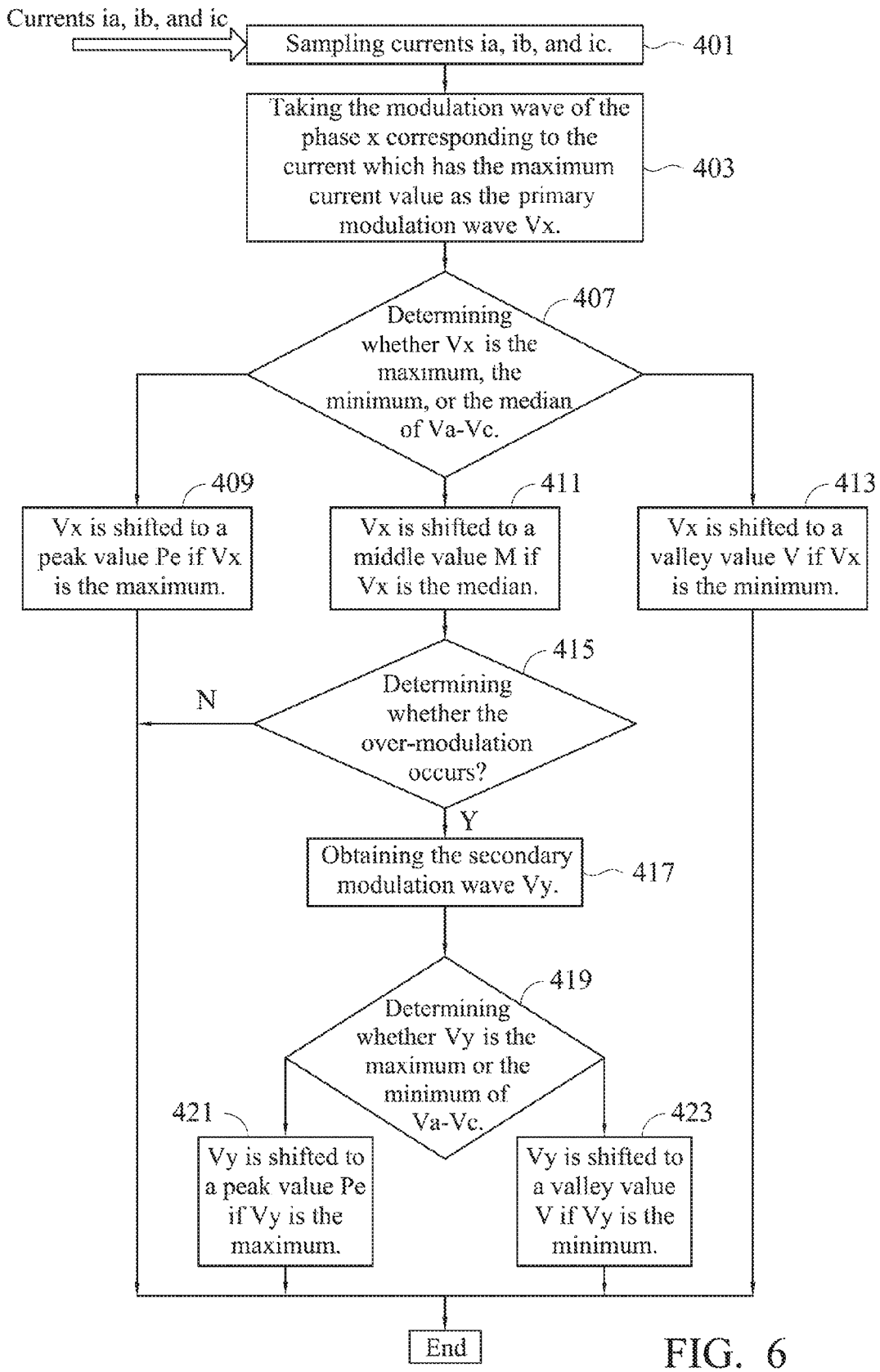
FIG. 6 is a flow diagram of a method for controlling modulation wave according to embodiments of the present invention.

Please refer to FIG. 6, which is a flow diagram of a method for controlling modulation wave according to embodiments of the present invention. First, in step 401, the currents ia, ib, and ic corresponding to each phase of the three-phase three-wire three-level circuit are sampled. For example, the currents flowing through each phase of the inductors may be sampled directly, or the currents of the switches of the bridge arms corresponding to the three phases are sampled, but the present invention is not limited thereto. In step 403, the modulation wave of the phase x corresponding to the current which has the maximum current value of the three currents of the three phases of the circuit is taken as the primary modulation wave Vx. Comparison of the current values may be used to found which current has the maximum current value. The said comparison of the current values may use the comparison of the absolute value of the current, but the present invention is not limited thereto. Subsequently, in step 407, determining whether the primary modulation wave Vx is the maximum, the minimum, or the median among the three modulation waves Va-Vc. In step 407, if the primary modulation wave Vx is determined as the maximum of the three modulation waves Va-Vc, then the step 409 is performed for adding a shifting quantity to the three modulation waves Va-Vc such that the primary modulation wave Vx is shifted to the peak value Pe of the carrier wave. For facilitating the understanding of this step, please refer to FIG. 3. If the primary modulation wave is determined as the maximum of the three modulation waves Va-Vc, such as A-phase modulation wave, then a shifting quantity is added to all the three modulation waves Va-Vc such that the primary modulation wave Va could be shifted to the peak value Pe of the carrier wave. Thus, the A-phase bridge arm in FIG. 3 is maintained in operating state P to reduce the overall switching times of the switches, and the switching loss may be efficiently decreased.

Please refer to step 407 continuously, if the primary modulation wave Vx is determined as the minimum of the three modulation waves Va-Vc, then the step 413 is performed for adding a shifting quantity to the three modulation waves Va-Vc such that the primary modulation wave Vx could be shifted to the valley value V of the carrier wave. For facilitating the understanding of this step, please refer to FIG. 4. If the primary modulation wave is determined as the minimum of the three modulation waves Va-Vc, such as C-phase modulation wave, then a shifting quantity is added to the three modulation waves Va-Vc such that the primary modulation wave Vc is shifted to the valley value V of the carrier wave. Thus, the C-phase bridge arm in FIG. 4 is maintained in operating state N to reduce the overall switching times of the switches, and the switching loss may be efficiently decreased.

Please refer to step 407 continuously, if the primary modulation wave Vx is determined as the median of the three modulation waves Va-Vc, then the step 411 is performed for adding a shifting quantity to the three modulation waves Va-Vc such that the primary modulation wave Vx could be shifted to the middle value M of the carrier wave. For facilitating the understanding of this step, please refer to FIG. 5. If the primary modulation wave is determined as the median of the three modulation waves Va-Vc, such as B-phase modulation wave, then a shifting quantity is added to the three modulation waves Va-Vc such that the primary modulation wave Vb is shifted to the middle value M of the carrier wave. Thus, the B-phase bridge arm in FIG. 5 is maintained in operating state O to reduce the overall switching times of the switches, and the switching loss may be efficiently decreased. The middle value M may be zero.

It should be noted that, if the step 411 is used, although the primary modulation wave Vx may be shifted to the middle value M of the carrier wave, it may cause another phase of the modulation wave to exceed the peak value Pe or the valley value V, and the over-modulation occurs, which leads to error happening for the three-level circuit. At this time, a modified way may be used to improve the aforementioned situation, as describe below.

After performing the step 411, the step 415 may be performed to determine whether any one of the three modulation waves Va-Vc exceeds the peak value Pe of the carrier wave or falls below the valley value V of the carrier wave after the primary modulation wave Vx is shifted to the middle value M of the carrier wave and the other two modulation wave are shifted accordingly, but the present invention is not limited thereto. If the three modulation waves Va-Vc do not exceed the peak value Pe of the carrier wave or fall below the valley value V of the carrier wave after the primary modulation wave Vx is shifted to the middle value of the carrier wave, the over-modulation has not occurred. The method for controlling modulation wave of the embodiment of the present invention may end in a switching cycle, and keeps to be applied in next switching cycle, but the present invention is not limited thereto. Furthermore, if any one of the three modulation waves Va-Vc exceeds the peak value Pe of the carrier wave or falls below the valley value V of the carrier wave after the primary modulation wave Vx is shifted to the middle value of the carrier wave, that is, the over-modulation has occurred. At this time, the modified way which is used is shown in following steps 417, 419, 421, and 423.

In step 417, this step is performed for determining the current which has the second maximum current value of the currents, and taking the modulation wave corresponding to the current which has the second maximum current value as the secondary modulation wave Vy. Then, in step 419, this step is performed for determining whether the secondary modulation wave Vy is the maximum or the minimum of the three modulation waves Va-Vc. If the secondary modulation wave Vy is determined as the maximum of the three modulation waves Va-Vc, then the step 421 is performed for adding a shifted quantity to the three modulation waves Va-Vc such that the secondary modulation wave Vy is shifted to the peak value Pe of the carrier wave. If the secondary modulation wave Vy is determined as the minimum of the three modulation waves Va-Vc, then the step 423 is performed for adding a shifted quantity to the three modulation waves Va-Vc such that the secondary modulation wave Vy is shifted to the valley value V of the carrier wave. Apparent from the above description, using the modified way may actually avoid the over-modulation to occur, but the present invention is not limited thereto, for example, it may be also accepted that the modulation wave which has the minimum current value is the secondary modulation wave.

Figure 7:
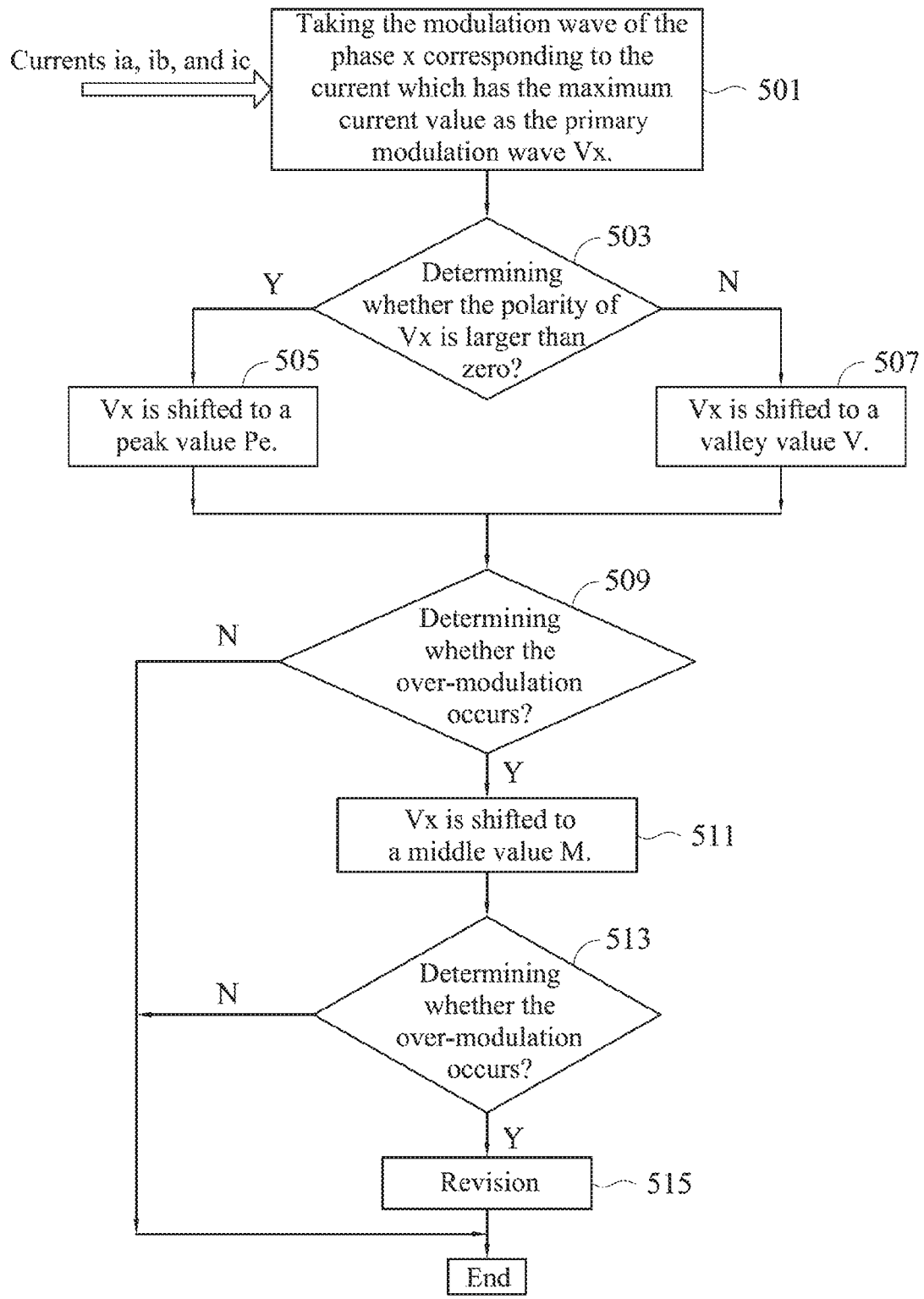
FIG. 7 is a flow diagram of a method for controlling modulation wave according to embodiments of the present invention.

Please refer to FIG. 7, which is a flow diagram of a method for controlling modulation wave according to embodiments of the present invention. First, in step 501, the modulation wave of the phase x corresponding to the current which has the maximum current value is taken as the primary modulation wave Vx. The comparison of the said currents usually uses the comparison of the absolute value, but the comparison of the efficient value or another comparing way which may represent the quantity of the current is also accepted, but the present invention is not limited thereto. In step 503, the polarity of the primary modulation wave Vx is determined. If the primary modulation wave Vx is larger than zero, then the step 505 is performed for adding a shifted quantity to the three modulation waves Va-Vc such that the primary modulation wave Vx is shifted to the peak value Pe of the carrier wave. If the primary modulation wave Vx is less than zero, then the step 507 is performed for adding a shifted quantity to the three modulation waves Va-Vc such that the primary modulation wave Vx is shifted to the valley value V of the carrier wave.

It should be noted that, after performing the above steps 505 and 507, the over-modulation may occur. Therefore, the step 509 may be performed to determine whether the over-modulation occurs. Specifically, the step 509 is performed to determine whether any one of the three modulation waves Va-Vc exceeds the peak value Pe of the carrier wave or falls below the valley value V of the carrier wave after the primary modulation wave Vx is shifted to the peak value Pe or the valley value V of the carrier wave. If the three modulation waves Va-Vc do not exceed the peak value Pe of the carrier wave or fall below the valley value V of the carrier wave after the primary modulation wave Vx is shifted, then the over-modulation has not occurred, the method for controlling modulation wave of the embodiment of the present invention may end in this switching cycle. Furthermore, if any one of the three modulation waves Va-Vc exceeds the peak value Pe of the carrier wave or falls below the valley value V of the carrier wave after the primary modulation wave is shifted to the peak value Pe or the valley value V of the carrier wave, then the step 511 is performed for adding a shifted quantity to the three modulation waves Va-Vc such that the primary modulation wave is shifted to the middle value M of the carrier wave.

It should be noted that, after performing the aforementioned step 511, the over-modulation may still occur. Therefore, the step 513 may be performed to determine whether the over-modulation occurs. Specifically, the step 513 is performed to determine whether any one of the three modulation waves Va-Vc exceeds the peak value Pe of the carrier wave or falls below the valley value V of the carrier wave after the primary modulation wave Vx is shifted to the middle value M of the carrier wave. If the three modulation waves Va-Vc do not exceed the peak value Pe of the carrier wave or fall below the valley value V of the carrier wave after the primary modulation wave Vx is shifted, then the over-modulation has not occurred. The function of the method for controlling modulation wave of the embodiment of the present invention in this switching cycle may end, and keeps to be applied in next switching cycle, but the present invention is not limited thereto. Furthermore, if any one of the three modulation waves Va-Vc exceeds the peak value Pe of the carrier wave or falls below the valley value V of the carrier wave after the primary modulation wave Vx is shifted to the middle value M the carrier wave, then the modified way of the step 515 may be used. Specifically, the step 515 is performed to determine the current which has the second maximum current value corresponding to each phase of the three-phase three-wire three-level circuit, and the modulation wave corresponding to the current which has the second maximum current value is taken as the secondary modulation wave Vy. Subsequently, a shifted quantity is added to the three modulation waves Va-Vc such that the secondary modulation wave is shifted to the peak value Pe or the valley value V of the carrier wave, for example, as shown of the steps 417, 419, 421, and 423 in FIG. 6, but the present invention is not limited thereto. Apparent from the above description, using the modified way may actually avoid the over-modulation to occur.

Figure 8:
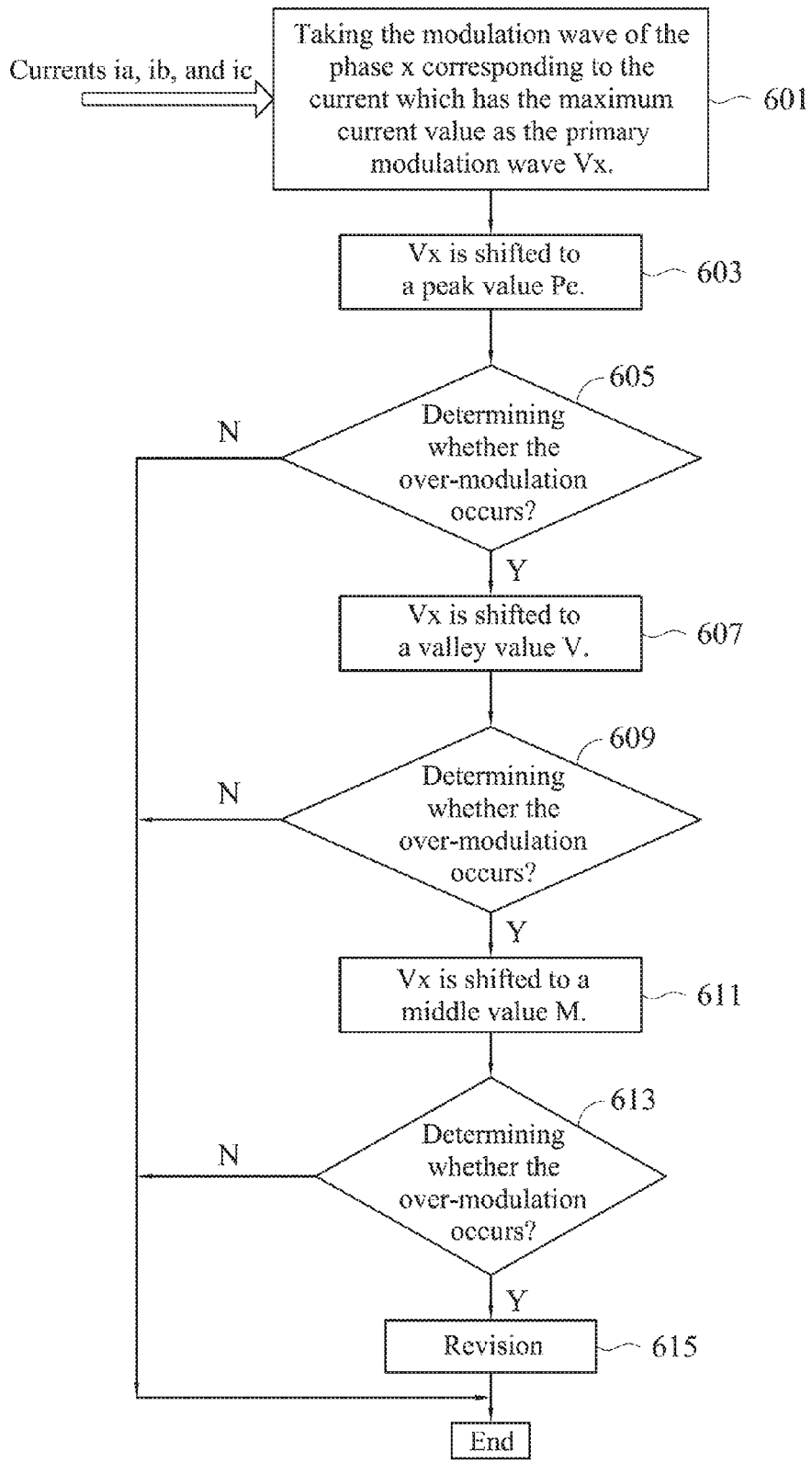
FIG. 8 is a flow diagram of a method for controlling modulation wave according to embodiments of the present invention.

Please refer to FIG. 8, which is a flow diagram of a method for controlling modulation wave according to embodiments of the present invention. First, in step 601, the modulation wave of the phase x corresponding to the current which has the maximum current value is taken as the primary modulation wave Vx. The comparison of the said currents usually uses the comparison of the absolute value, but the comparison of the efficient value or another comparing way which may represent the quantity of the current is also accepted, but the present invention is not limited thereto. In step 603, a shifted quantity is added to the three modulation waves Va-Vc such that the primary modulation wave Vx is shifted to the peak value Pe of the carrier wave. It should be noted that, after performing the aforementioned step 603, the over-modulation may occur. Therefore, the step 605 is performed to determine whether the over-modulation occurs. Specifically, the step 605 is performed to determine whether any one of the three modulation waves Va-Vc exceeds the peak value Pe of the carrier wave or falls below the valley value V of the carrier wave after the primary modulation wave Vx is shifted to the peak value Pe of the carrier wave. If the three modulation waves Va-Vc do not exceed the peak value Pe of the carrier wave or fall below the valley value V of the carrier wave after the primary modulation wave Vx is shifted, the over-modulation has not occurred. The function of the method for controlling modulation wave of the embodiment of the present invention in this switching cycle may end, and keeps to be applied in next switching cycle, but the present invention is not limited thereto. Furthermore, if any one of the three modulation waves Va-Vc exceeds the peak value Pe of the carrier wave or falls below the valley value V of the carrier wave after the primary modulation wave Vx is shifted to the peak value Pe the carrier wave, then the step 607 is performed for adding a shifted quantity to the three modulation waves Va-Vc such that the primary modulation wave is shifted to the valley value V of the carrier wave.

It should be noted that, after performing the aforementioned step 607, the over-modulation may occur. Therefore, the step 609 is performed to determine whether the over-modulation occurs. Specifically, the step 609 is performed to determine whether any one of the three modulation waves Va-Vc exceeds the peak value Pe of the carrier wave or falls below the valley value V of the carrier wave after the primary modulation wave Vx is shifted to the valley value V of the carrier wave. If the three modulation waves Va-Vc do not exceed the peak value Pe of the carrier wave or fall below the valley value V of the carrier wave after the primary modulation wave Vx is shifted, the over-modulation has not occurred, the method for controlling modulation wave of the embodiment of the present invention may end in this switching cycle. Furthermore, if any one of the three modulation waves Va-Vc exceeds the peak value Pe of the carrier wave or falls below the valley value V of the carrier wave after the primary modulation wave is shifted to the valley value V of the carrier wave, then the step 611 is performed for adding a shifted quantity to the three modulation waves Va-Vc such that the primary modulation wave is shifted to the middle value M of the carrier wave.

It should be noted that, after performing the aforementioned step 611, the over-modulation may occur. Therefore, the step 613 is performed to determine whether the over-modulation occurs. Specifically, the step 613 is performed to determine whether any one of the three modulation waves Va-Vc exceeds the peak value Pe of the carrier wave or falls below the valley value V of the carrier wave after the primary modulation wave Vx is shifted to the middle value M of the carrier wave. If the three modulation waves Va-Vc do not exceed the peak value Pe of the carrier wave or fall below the valley value V of the carrier wave after the primary modulation wave Vx is shifted, the over-modulation has not occurred. The function of the method for controlling modulation wave of the embodiment of the present invention in this switching cycle may end, and keeps to be applied in next switching cycle, but the present invention is not so limited. Furthermore, if any one of the three modulation waves Va-Vc exceeds the peak value Pe of the carrier wave or falls below the valley value V of the carrier wave after the primary modulation wave Vx is shifted to the middle value M the carrier wave, then the modified way of the step 615 is used. Specifically, the step 615 is performed to determine the current which has the second maximum current value of the currents corresponding to each phase of the three-phase three-wire three-level circuit, and the modulation wave corresponding to the current which has the second maximum current value is taken as the secondary modulation wave Vy. Subsequently, a shifted quantity is added to the three modulation waves Va-Vc such that the secondary modulation wave is shifted to the peak value Pe or the valley value V of the carrier wave, for example, as shown of the steps 417, 419, 421, and 423 in FIG. 6, but the present invention is not limited thereto. Apparent from the above description, using the modified way may actually avoid the over-modulation to occur. In present embodiment, the order of the steps 603, 607, and 611 may be reversed and changed, and the present invention is not limited thereto.

In an embodiment, the present invention provides a three-phase three-wire three-level circuit, which may use the method for controlling modulation wave as shown in FIGS. 3-5, and may perform the flows of the method for controlling modulation wave as shown in FIGS. 6-8. In another embodiment, the three-phase three-wire three-level circuit is a Three-Level Diode Neural Point Clamped (DNPC) circuit, a T-type Neutral Point Clamped (TNPC) circuit, an Active Neutral Point Clamped (ANPC) circuit, or a flying capacitor three-level circuit, and the present invention is not limited thereto.

Those skilled in the art can understand that each step of the method for controlling modulation wave is named according to their function, just to make the technology of the present invention become apparent, but not intended to limit these steps. Each step may be integrated into a step or any step may be split into multiple steps, or to replace any step to another step in the implementation are still part of this disclosed embodiment of the content.

The embodiments of the present invention provide a three-phase three-wire three-level circuit and a method for controlling the modulation waves, thereby efficiently reducing the switching loss of the semiconductor switching device, and decreasing the thermal stress of the semiconductor switching device, and improving the overall system efficiency.

Although above DETAILED DESCRIPTION discloses the specific embodiment of present invention. However, it is not used to limit present invention. Those skilled in the art can make various changes and modifications of the present invention without departing from the principle and spirit of the invention. Therefore, the scope of present invention should refer to the following claims.

What is claimed is:

1. A method for controlling a modulation wave, applied in a three-phase three-wire three-level circuit, wherein three bridge arms of the three-phase three-wire three-level circuit correspond to at least three modulation waves, and the three-phase three-wire three-level circuit is controlled by comparing the three modulation waves and a carrier wave, comprising:
   obtaining a primary modulation wave from the three modulation waves based on the currents corresponding to each phase of the three-phase three-wire three-level circuit; and
   adding a shifting quantity to the three modulation waves such that the primary modulation wave is shifted to a peak value, a valley value, or a middle value between the peak value and the valley value of the carrier wave, further comprising:
   determining polarity of the primary modulation wave to add the shifting quantity to the three modulation waves such that the primary modulation wave is shifted to the peak value or the valley value of the carrier wave;
   if any one of the three modulation waves exceeds the peak value of the carrier wave or falls below the valley value of the carrier wave after the primary modulation wave is shifted to the peak value or the valley value of the carrier wave, the method for controlling modulation wave further comprising:
   adding the shifting quantity to the three modulation waves such that the primary modulation wave is shifted to the middle value of the carrier wave.

2. The method for controlling modulation wave of claim 1, wherein obtaining the primary modulation wave from the three modulation waves comprises:
   determining the current which has the maximum current value of the currents; and
   taking the modulation wave corresponding to the current which has the maximum current value as the primary modulation wave.

3. The method for controlling modulation wave of claim 1, wherein if any one of the three modulation waves exceeds the peak value of the carrier wave or falls below the valley value of the carrier wave er the primary modulation wave is shifted to the middle value of the carrier wave, the method for controlling modulation wave further comprises:
   determining the current which has the second maximum current value of the currents;
   taking the modulation wave corresponding to the current which has the second maximum current value as a secondary modulation wave; and
   adding the shifting quantity to the three modulation waves such that the secondary modulation wave is shifted to the peak value or the valley value of the carrier wave.

4. A three-phase three-wire three-level circuit, using the method for controlling modulation wave of claim 1.

5. A method for controlling a modulation wave, applied in a three-phase three-wire three-level circuit, wherein three bridge arms of the three-phase three-wire three-level circuit correspond to at least three modulation waves, and the three-phase three-wire three-level circuit is controlled by comparing the three modulation waves and a carrier wave, comprising:
   obtaining a primary modulation wave from the three modulation waves based on the currents corresponding to each phase of the three-phase three-wire three-level circuit; and
   adding a shifting quantity to the three modulation waves such that the primary modulation wave is shifted to a high value, a low value, or a middle value between the high value and the low value of the carrier wave, further comprising:
   determining polarity of the primary modulation wave to add the shifting quantity to the three modulation waves such that the primary modulation wave is shifted to the high value or the low value of the carrier wave;
   if any one of the three modulation waves exceeds the high value of the carrier wave or falls below the low value of the carrier wave after the primary modulation wave is shifted to the high value or the low value of the carrier wave, the method for controlling modulation wave further comprising:
   adding the shifting quantity to the three modulation waves such that the primary modulation wave is shifted to the middle value of the carrier wave.

6. The method for controlling modulation wave of claim 5, wherein obtaining the primary modulation wave from the three modulation waves comprises:
   determining the current which has the maximum current value of the currents; and
   taking the modulation wave corresponding to the current which has the maximum current value as the primary modulation wave.

7. The three-phase three-wire three-level circuit of claim 4, wherein the three-phase three-wire three-level circuit is a Three-Level Diode Neural Point Clamped (DNPC) circuit, a T-type Neutral Point Clamped (TNPC) circuit, an Active Neutral Point Clamped (ANPC) circuit, or a flying capacitor three-level circuit.

8. A method for controlling a modulation wave, applied in a three-phase three-wire three-level circuit, wherein three bridge arms of the three-phase three-wire three-level circuit correspond to at least three modulation waves, and the three-phase three-wire three-level circuit is controlled by comparing the three modulation waves and a carrier wave, comprising:
   obtaining a primary modulation wave from the three modulation waves based on the currents corresponding to each phase of the three-phase three-wire three-level circuit; and
   adding a shifting quantity to the three modulation waves such that the primary modulation wave is shifted to a peak value, a valley value, or a middle value between the peak value and the valley value of the carrier wave, further comprising:
   adding the shifting quantity to the three modulation waves such that the primary modulation wave is shifted to one of the peak value, the valley value, and the middle value of the carrier wave;
   if any one of the three modulation waves exceeds the peak value of the carrier wave or falls below the valley value of the carrier wave after the primary modulation wave is shifted to the such value of the carrier wave, the method for controlling modulation wave further comprising:
   adding the shifting quantity to the three modulation waves such that the primary modulation wave is shifted to another one of the peak value, the valley value, and the middle value of the carrier wave;
   if any one of the three modulation waves exceeds the peak value of the carrier wave or falls below the valley value of the carrier wave after the primary modulation wave is shifted to another one value of the carrier wave, the method for controlling modulation wave further comprising:
   adding the shifting quantity to the three modulation waves such that the primary modulation wave is shifted to a third one of the peak value, the valley value, and the middle value of the carrier wave.

9. The method for controlling modulation wave of claim 8, wherein if any one of the three modulation waves exceeds the peak value of the carrier wave or falls below the valley value of the carrier wave after the primary modulation wave is shifted to the third value of the carrier wave, the method for controlling modulation wave further comprises:
   determining the current which has the second maximum current value of the currents;
   taking the modulation wave corresponding to the current which has the second maximum current value as a secondary modulation wave; and
   adding the shifting quantity to the three modulation waves such that the secondary modulation wave is shifted to the peak value or the valley value of the carrier wave.

* * * * *